(12) United States Patent
VanBlon et al.

(10) Patent No.: US 9,405,809 B2
(45) Date of Patent: Aug. 2, 2016

(54) DISPLAYING VISITED DOCUMENT DATA

(71) Applicant: LENOVO (Singapore) PTE, LTD., New Tech Park (SG)

(72) Inventors: Russell Speight VanBlon, Raleigh, NC (US); John Carl Mese, Cary, NC (US); Nathan J. Peterson, Durham, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/505,156

(22) Filed: Oct. 2, 2014

(65) Prior Publication Data

US 2016/0098461 A1    Apr. 7, 2016

(51) Int. Cl.
*G06K 7/10*    (2006.01)
*G06F 17/30*   (2006.01)

(52) U.S. Cl.
CPC .... *G06F 17/30554* (2013.01); *G06F 17/30011* (2013.01); *G06F 17/3053* (2013.01); *G06F 17/30864* (2013.01)

(58) Field of Classification Search
CPC ........ G06Q 30/02; G07F 7/1008; G06K 7/14; G06K 7/1417; G06K 17/00; G06K 7/10693
USPC ................... 235/462.1, 375, 462.13; 707/706
See application file for complete search history.

(56) References Cited

U.S. PATENT DOCUMENTS

2012/0271805 A1*  10/2012  Holenstein ........ G06F 17/30876
                                                         707/706

* cited by examiner

*Primary Examiner* — Karl D Frech
(74) *Attorney, Agent, or Firm* — Kunzler Law Group

(57) ABSTRACT

For displaying visited document data, code stores visited document data comprising a visited document address and a visited document description for each document visited. In addition, the code displays on the display one or more of a first visited document address and a first visited document description with a search result in response to a portion of the visited document address matching a portion of a search result address.

18 Claims, 10 Drawing Sheets

210 ↘

Manuals and Literature – Mayfair ⌣ 215
www.mayfairwashers.com/manuals/ ⌣ 220
Traditional Washers, Traditional Dryers, Laundry Pairs, Service and Support.  ⌣ 225

295
　　　⌒‿‿‿‿‿‿‿‿‿⌒
www.mayfairwashers.com/manuals/

245 ↘

295
　　　⌒‿‿‿‿‿‿‿‿‿⌒
www.mayfairwashers.com/manuals/download/model/SR42697/

FIG. 2C

DISPLAYING VISITED DOCUMENT DATA

BACKGROUND

1. Field

The subject matter disclosed herein relates to visited document data and more particularly relates to displaying visited document data.

2. Description of the Related Art

Search results often only provided initial starting for a search among documents.

BRIEF SUMMARY

An apparatus for displaying visited document data is disclosed. The apparatus includes a display, a processor, and a memory that stores code executable by the processor. The code stores visited document data comprising a visited document address and a visited document description for each document visited. In addition, the code displays on the display one or more of a first visited document address and a first visited document description with a search result in response to a portion of the visited document address matching a portion of a search result address. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a text illustration showing one embodiment of search results;

FIG. 2C is a text illustration showing one embodiment of a search result address and a visited document address;

DETAILED DESCRIPTION

Figure 1A:
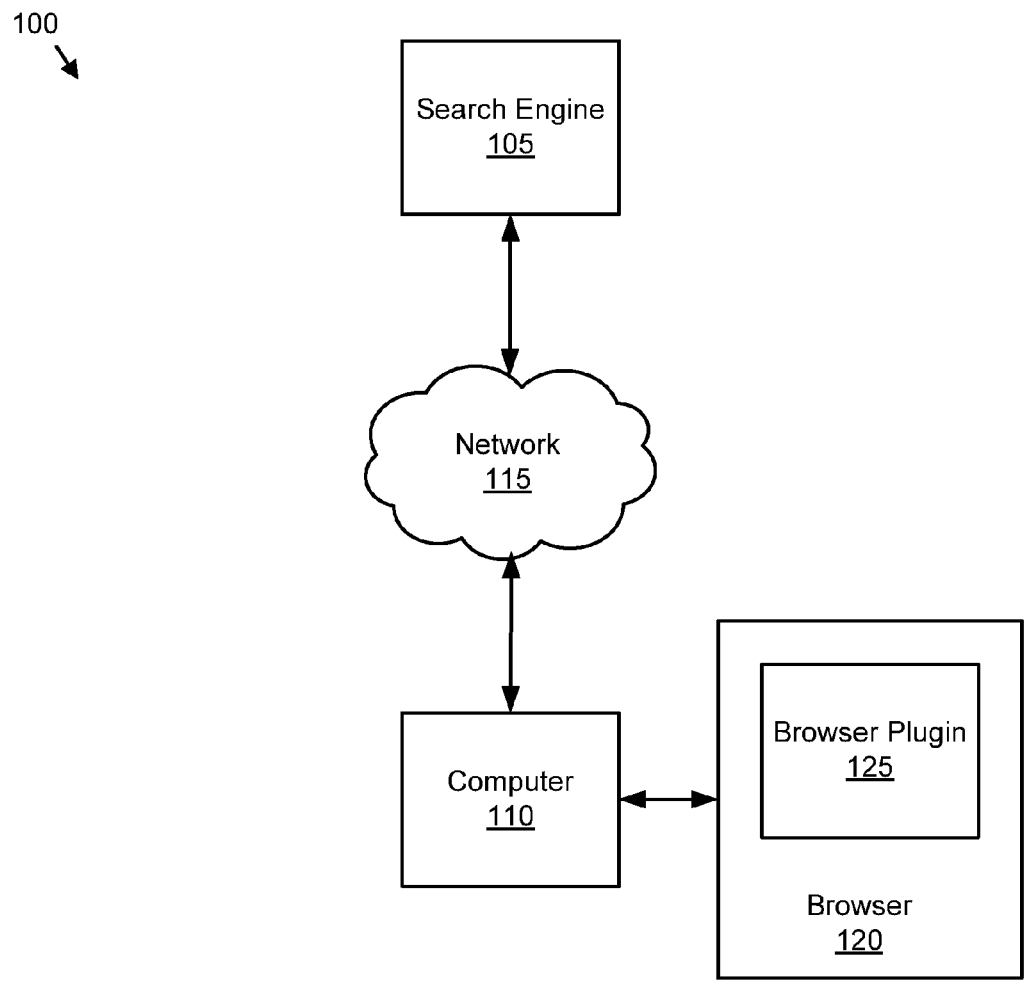
FIG. 1A is a schematic block diagram illustrating one embodiment of a search system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a search system 100. The system 100 may deliver search results to a computer 110. The system 100 includes a search engine 105, a network 115, the computer 110, and a browser 120. In one embodiment, the browser 120 includes a browser plug-in 125.

The computer 110 may initiate a search. In one embodiment, the search is among documents on the computer 110 and/or a storage device in communication with the computer 110. For example, the computer 110 may search for a phrase within file documents.

Alternatively, the computer 110 may initiate the search with the search engine 105. The computer 110 may communicate search criteria to the search engine 105 and receive search results from the search engine 105. The search results may be web page documents. In one embodiment, the computer 110 communicates the search criteria and receives the search results using the browser 120.

The search results may or may not include a desired document. For example, a webpage search result may include one or more links that may ultimately lead a user to the desired web page document, but not the desired document. Similarly, a file search result may indicate a folder or group of folders that ultimately lead the user to the desired document.

The user may have previously followed the links and/or folders to find the desired document. The user may subsequently perform the same search. Unfortunately, the user must again follow links and/or folders to find the desired document.

The embodiments described herein display visited document data including a visited document address and/or a visited document description with the search results. The visited document data may be displayed in response to a portion of the visited document address matching a portion of a search result address. As a result, the user is able to find the desired document more rapidly as will be described hereafter.

Figure 1B:
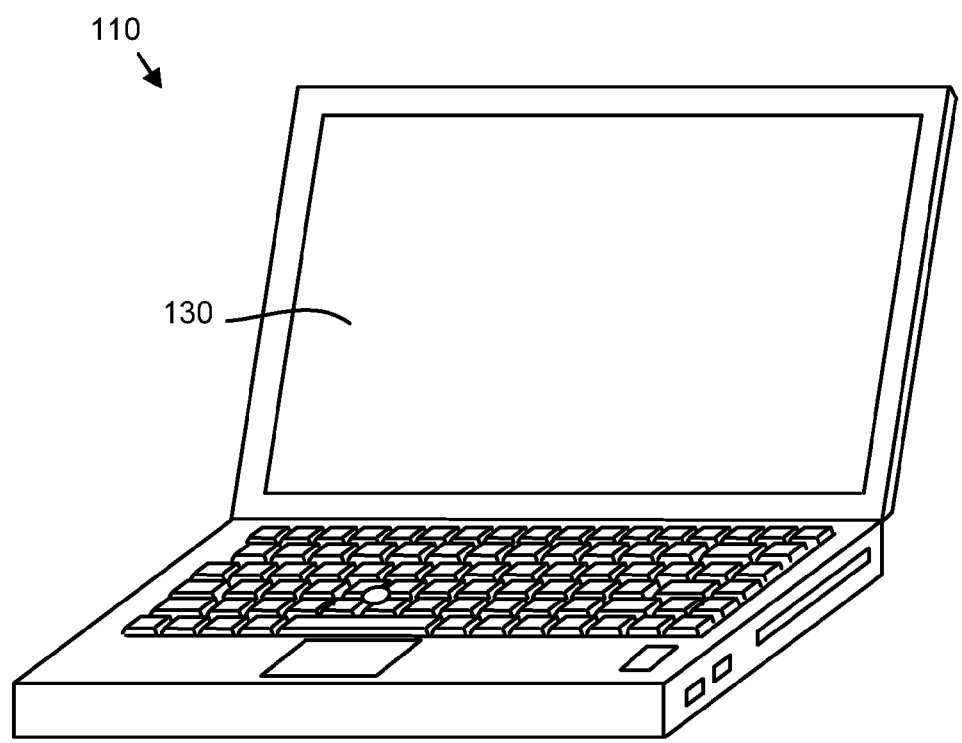
FIG. 1B is a perspective drawing illustrating one embodiment of a computer.

FIG. 1B is a perspective drawing illustrating one embodiment of a computer 110. The computer 110 includes a display 130. The browser 120 may be displayed on the display 130. The browser 120 may display the search results using the display 130. Alternatively, the display 130 may directly provide the search results to the user.

Figure 2A:
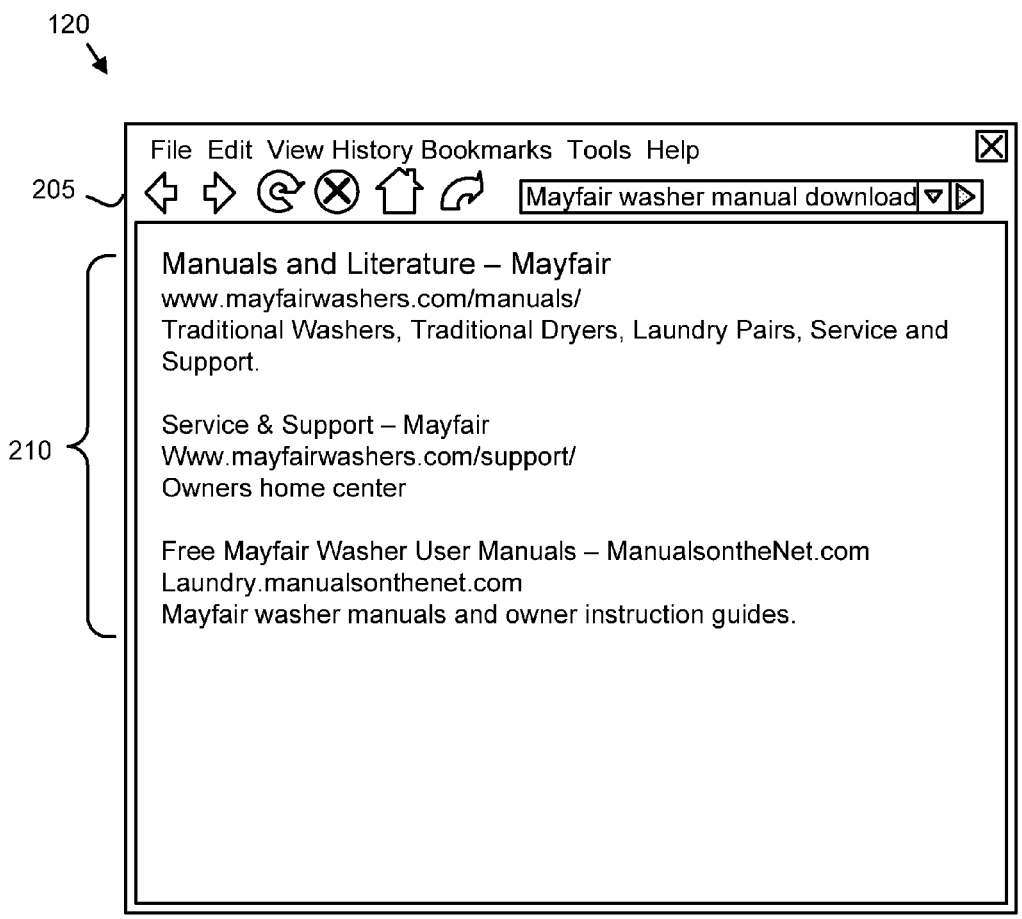
FIG. 2A is a drawing illustrating one embodiment of a browser with search results.

FIG. 2A is a drawing illustrating one embodiment of a browser 120 with search results 210. The browser 120 is shown. The browser 120 includes one or more controls 205. In the depicted embodiment, the browser 120 shows search results 210 in response to a search. The search results 210 or described in more detail in FIG. 2B.

FIG. 2B is a text illustration showing one embodiment of search results 210. In the depicted embodiment, the search results 210 is a webpage search result 210. The search result 210 includes a search result title 215, a search result address 220, and a search result description 225.

FIG. 2C is a text illustration showing one embodiment of a search result address 220 and a visited document address 245. In the depicted embodiment, the search result address 220 and the visited document address 245 are Universal Resource Locator (URL) addresses. The search result address 220 and the visited document address 245 each depicted as having a common domain name 295.

Figure 2D:
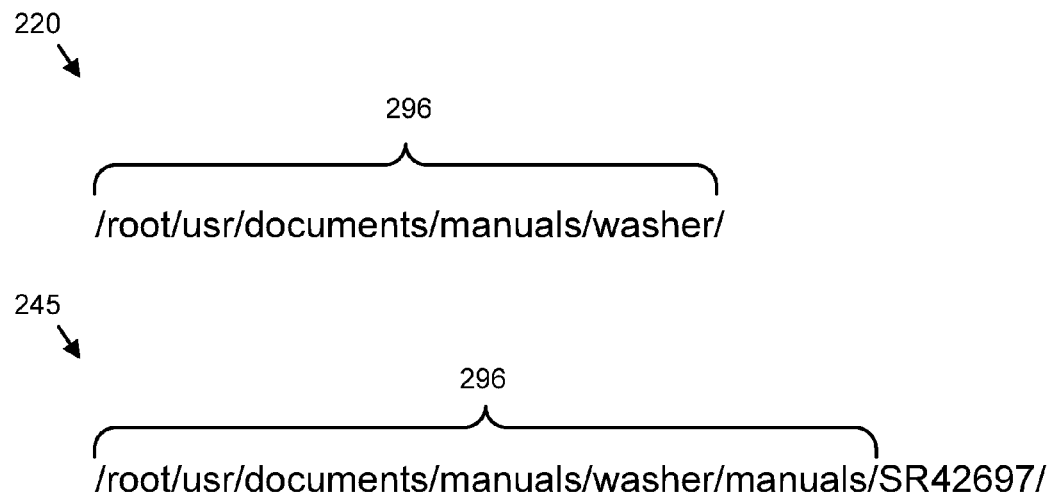
FIG. 2D is a text illustration showing one alternate embodiment of a search result address and a visited document address.

FIG. 2D is a text illustration showing one alternate embodiment of a search result address 220 and a visited document address 245. In the depicted embodiment, the search result address 220 and the visited document address 245 are operating system directory paths. The search result address 220 and visited document address 245 are depicted as having a common parent path 296.

Figure 2E:
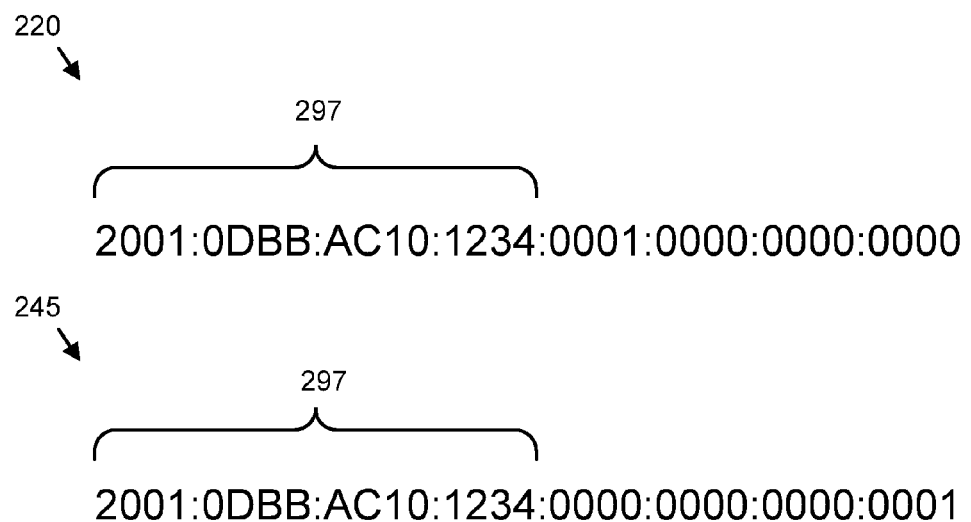
FIG. 2E is a text illustration showing one alternate embodiment of a search result address and a visited document address.

FIG. 2E is a text illustration showing one alternate embodiment of a search result address 220 and a visited document address 240. In the depicted embodiment, the search result address 220 and the visited document address 245 are Internet protocol (IP) addresses. The search result address 220 and the visited document address 245 are depicted as having a common IP address 297.

Internet protocol (IP) address. The IP address

Figure 2F:
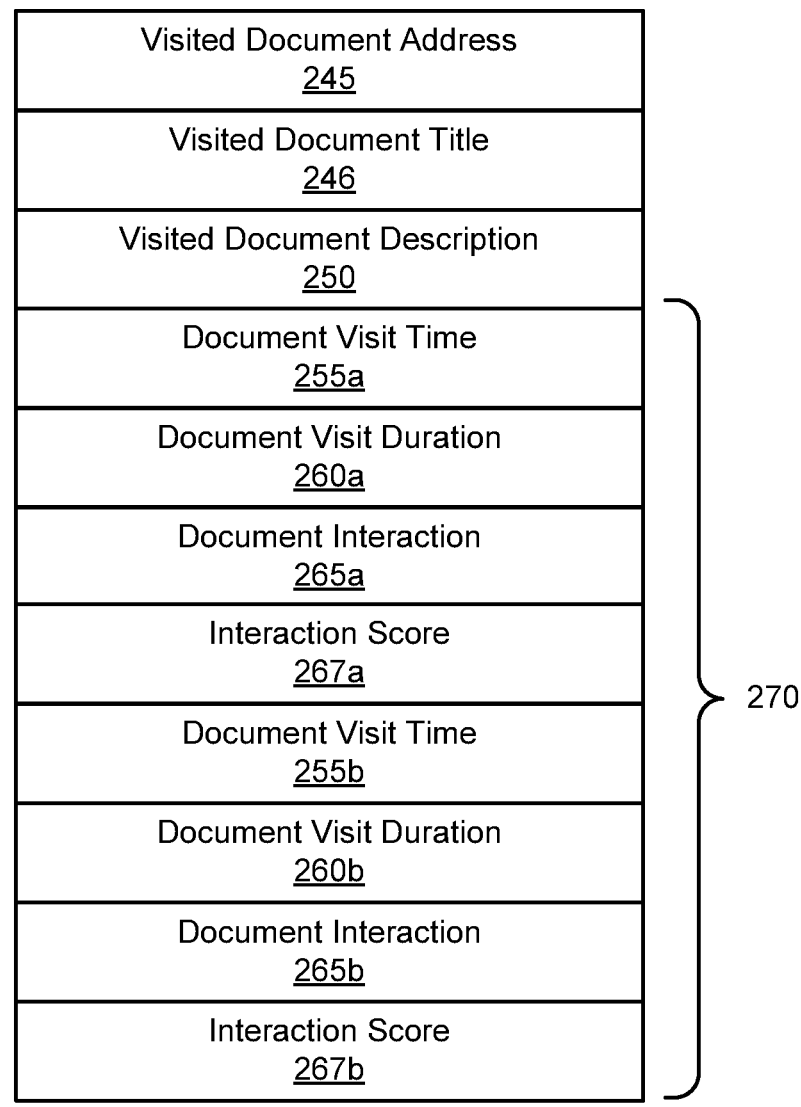
FIG. 2F is a schematic block diagram illustrating one embodiment of visited document data.

FIG. 2F is a schematic block diagram illustrating one embodiment of visited document data 240. The visited document data 240 may be organized in a data structure of a memory. In one embodiment, the visited document data 240 is stored for each document retrieved as the result of a search. The visited document data 240 maybe organized in a database. The visited document data 240 may catalog a search result document.

In the depicted embodiment, the visited document data 240 includes a visited document address 245, a visited document title 246, a visited document description 250, and visited document activity data 270. In one embodiment, the visited document address 245 stores the search result address 220 from the search result 210. The visited document address 245 may uniquely identify the visited document data 240.

The visited document title 246 may describe the search result 210. The visited document title 246 may store the search result title 215. The visited document description 250 may further describe the search result 210. In one embodiment, the visited document description 250 stores the search result description 225.

The visited document activity data 270 may describe each instance that the search result document is accessed using the computer 110. A document visit time 255, a document visit duration 260, and a document interaction 265 are recorded for each instance that the search result document is accessed. The document visit time 255 may record a time of the access. For example, the document visit time 255 may be Sep. 15, 2013 8:02 a.m.

The document visit duration 260 may record a time interval of the access. For example, if the user accesses a webpage search result document for 15 minutes, the document visit duration 260 is 15 minutes.

The document interaction 265 may record one or more interactions with the search result document. In addition, the document interaction 265 may record a quantity of each interaction. Table 1 illustrates one embodiment of interaction quantity data. Various quantities are interaction illustrated.

TABLE 1

| Interaction | Quantity |
| --- | --- |
| Download | 2 |
| Active Scrolling | 30 seconds |
| Scroll To End | YES |

In one embodiment, the document interaction 265 includes an interaction score 267. The interaction score 267 may be calculated as a function of the quantities for each interaction, the document visit time 255, and the document visit duration 260.

Figure 3A:
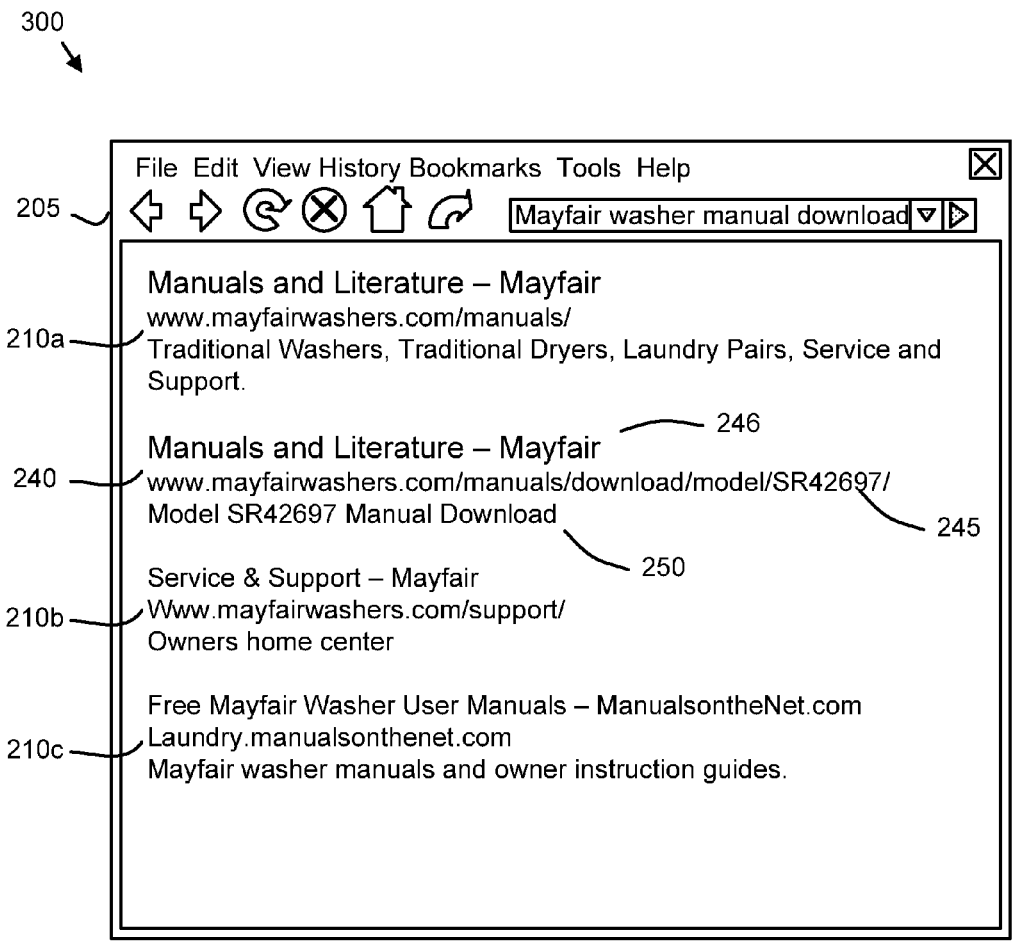
FIG. 3A is a drawing illustrating one embodiment of a browser displaying visited document data.

FIG. 3A is a drawing illustrating one embodiment of a browser 120 displaying visited document data 240. The browser 120 and search results 210 of FIG. 2A are shown. In addition, visited document data 240 are displayed with the search results 210. The visited document data 240 may include one or more of the visited document title 246, the visited document address 245, and the visited document description 250. In the depicted embodiment, the visited document data 240 are displayed integrated with the search results 210.

Figure 3B:
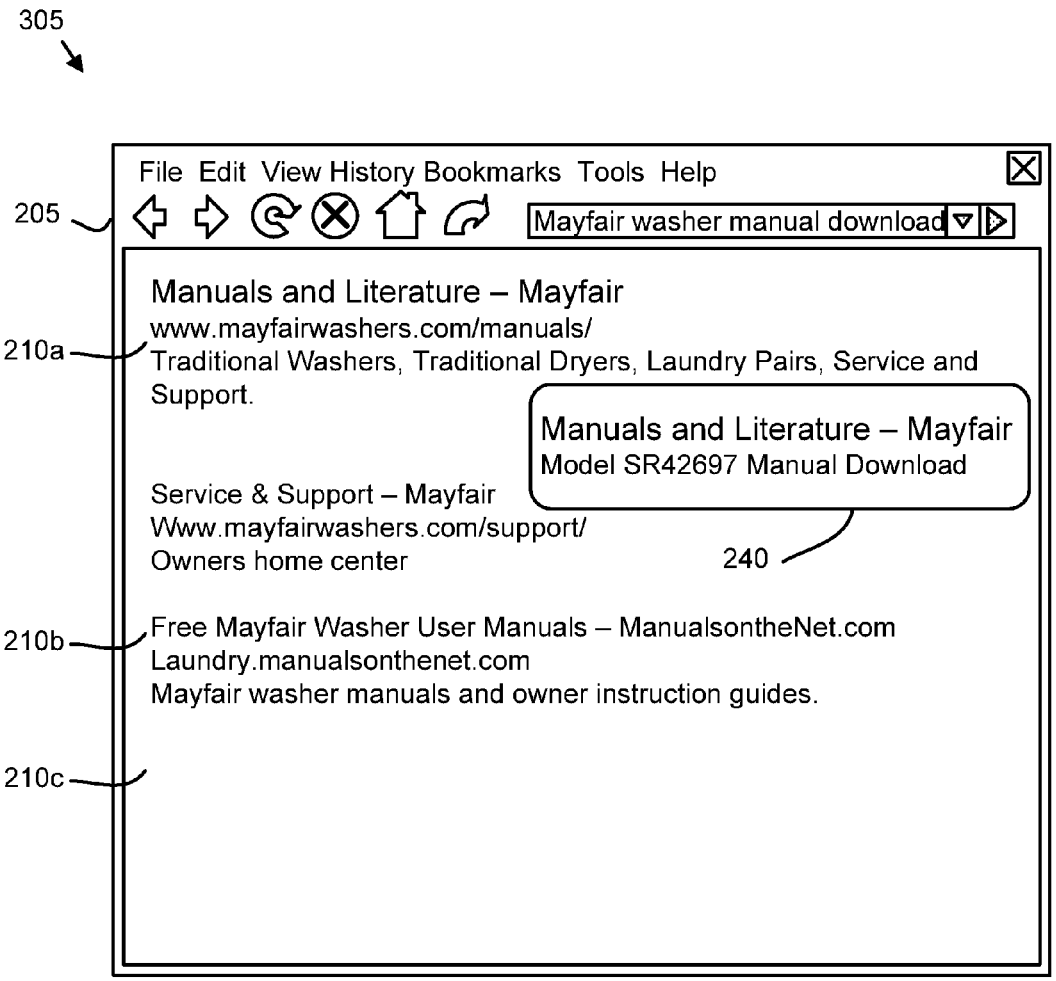
FIG. 3B is a drawing illustrating one alternate embodiment of a browser displaying visited document data.

FIG. 3B is a drawing illustrating one alternate embodiment of a browser 120 displaying visited document data 240. In the depicted embodiment, the visited document data 240 are displayed overlaying the search results 210. For example, the visited document data 240 may be overlaid in a white space of the search results 210. Alternatively, the visited document data 240 may be displayed adjacent to the search results 210.

Figure 4:
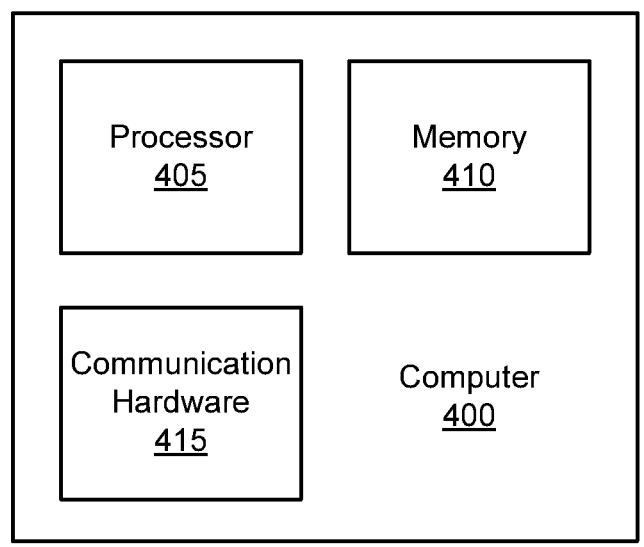
FIG. 4 is a schematic block diagram illustrating one embodiment of a computer.

FIG. 4 is a schema diagram illustrating one embodiment of a computer 400. The computer 400 may be the computer 110, the search engine 105, or combinations thereof. The computer 400 includes a processor 405, a memory 410, and communication hardware 415. The memory 410 may comprise a semiconductor storage device, a hard disk drive, an optical storage device, a micromechanical storage device, or combinations thereof. The memory 410 may be a computer readable storage medium and may store code. The processor 405 may execute the code. The communication hardware 415 may communicate with other devices.

Figure 5:
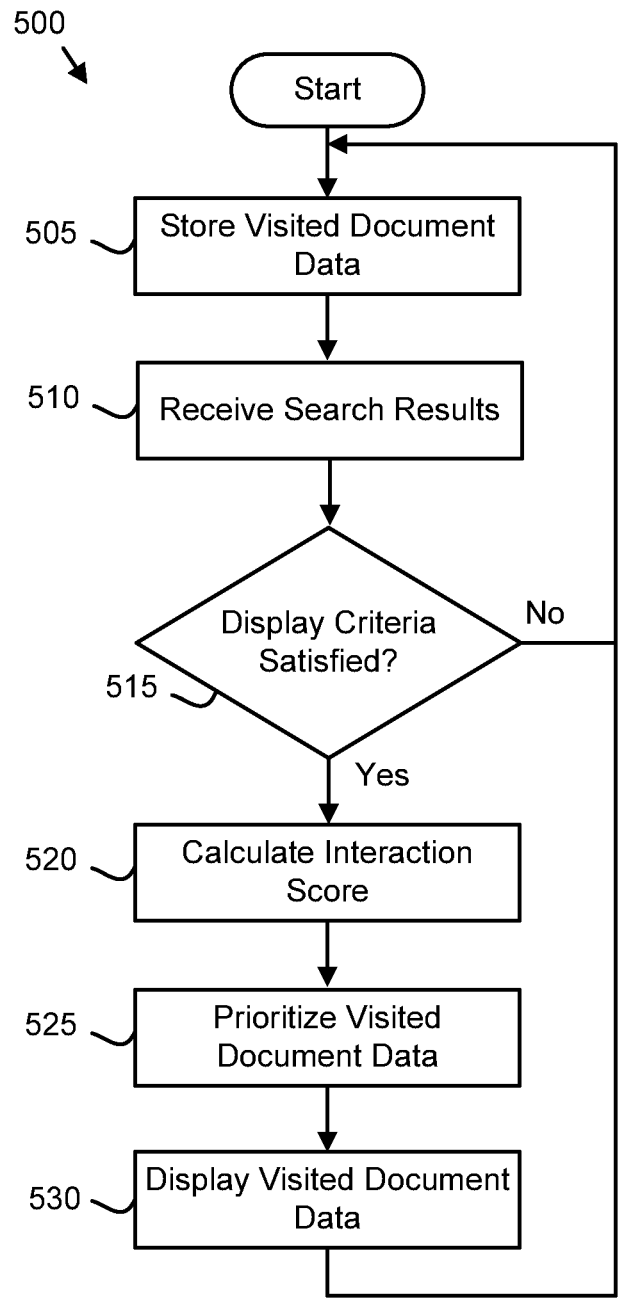
FIG. 5 is a schematic flow chart diagram illustrating one embodiment of a visited document data display method.

FIG. 5 is a schematic flow chart diagram illustrating one embodiment of a visited document data display method 500. The method 500 may display the visited document data 240 along with search results 210. The method 500 may be performed by the processor 405. Alternatively, the method 500 may be performed by a computer readable storage medium such as the memory 410 storing code that is executed by the processor 405.

The method 500 starts, and in one embodiment, the code stores 505 the visited document data 240 from one or more search results 210. The visited document data 240 may be stored by one or more of the browser 120, the search engine 105, and/or the browser plug-in 125. In addition, the visited document data 240 may be stored by the computer 110.

In one embodiment, the code parses the search result title 215, the search result address 220, and the search result description 225 from each search result 210. The code may further store 505 the search result title 215, the search result address 220, and the search result description 225 as the visited document title 246, the visited document address 245, and the visited document description 250.

In addition, the code may store 505 a time of the access to the search result 210 as the document visit time 255. The time interval of the access of the search result 210 may be recorded as the document visit duration 260. In addition, the code may store each instance of an interaction with the search result 210 as the document interaction 265.

In one embodiment, the code receives 510 search results 210. The search results 210 may be received 510 from the search engine 105. Alternatively, the search results 210 may be received 510 from the computer 110. The search results 210 may be received 510 in response to search criteria such as search keywords.

For example, the user may initiate a search from the computer 110 using the search engine 105. The user may communicate the search keywords to the search engine 105. The computer 110 may receive the search results 210 from the search engine 105.

The code may determine 515 if display criteria are satisfied by visited document data 240. The display criteria may be satisfied if a portion of the visited document address 245 matches a portion of the search result address 220. In one embodiment, the visited document address 245 comprises a domain name 295. The portion of the visited document address 245 may match the portion of the search result address 220 if the domain name 295 of the visited document address 245 matches the domain name 295 of the search result address 220.

Alternatively, the visited document address 245 may comprise a common parent path 296. The portion of the visited document address 245 may match the portion of the search result address 220 if the common parent path 296 of the visited document address 245 matches the common parent path 296 of the search result address 220.

In one embodiment, the display criteria are satisfied based on a document visit duration 260. The display criteria may be satisfied if the document visit duration 260 exceeds a visit duration threshold. The visit duration threshold may be in the range of 1 to 5 minutes.

If the display criteria are not satisfied, the code continues to store 505 visited document data 240. If the display criteria is satisfied, the code may calculate 520 an interaction score IS 267 from the document activity data 270 for the visited document data 240. The interaction score 267 may be calculated using Equation 1, where TS is a current timestamp, DVT is the document visit time 255, DVD is the document visit duration 260, DQ is the download quantity, AS is the active scrolling, and SE is a Boolean value for scrolling to the end of a document.

$$IS=(k1/(TS-DVT))+(k2*DVD)+(k3*DQ)+(k4*AS)+(k5*SE) \quad \text{Eq. 1}$$

In one embodiment, the code prioritizes 525 the visited document data 240 for each document that satisfies the display criteria. The visited document data 240 may be prioritized based on the visited document activity data 270 for each visited document address 220.

The visited document data 240 may be prioritized 525 by document visit duration 260. For example, the visited document data 240 with the longest document visit duration 260 may be prioritized first, and the visited document data 240 with the shortest document visit duration 260 may be prioritized last.

Alternatively, the visited document data 240 may be prioritized by document visit time 255. For example, visited document data 240 with the most recent document visit time 255 may be prioritized ahead of visited document data 240 with later document visit times 255.

In one embodiment, the visited document data 240 may be prioritized by the interaction score 267. For example, the visited document data 240 may be prioritized from highest interaction score 267 to lowest interaction score 267.

The code may display 530 the visited document data 240 with one or more search results 210. In one embodiment, the visited document data 240 is displayed in response to satisfying display criteria.

In one embodiment, the visited document data 240 is displayed 530 overlaying the search results 210 as illustrated in FIG. 3B. In a certain embodiment, the visited document data 240 is displayed 530 overlaying an area of white space among the search results 210.

Alternatively, the visited document data 240 may be displayed 530 integrated with the search results 210 as shown in FIG. 3A. In one embodiment, the visited document data 240 is displayed 530 below a search result 210 corresponding to the visited document data 240. In a certain embodiment, the visited document data 240 is displayed above a search result 210 corresponding to the visited document data 240.

In addition, the visited document data 240 may be displayed 532 a side of a search result 210. In one embodiment, the visited document data 240 is displayed 530 to the right of the search result 210 with a portion of the search result address 220 matching the portion of the visited document address 245. Alternatively, the visited document data 240 is displayed to the left of the search result 210 with a portion of the search result address 220 matching the portion of the visited document address 245.

In one embodiment, the code rearranges a priority of the search results 210 in response to the priority of the visited document data 240. For example, the code may increase the priority of a search result 210 with high-priority visited document data 240 and decrease the priority of a search result 210 with low priority visited document data 240.

For example, a first search result 210 may be prioritized ahead of a second search result 210 by the search engine 105. However, the first search result may have corresponding low-priority visited document data 240 while the second search result 210 may have corresponding high-priority visited document data 240. The code may display 530 the second search result 210 ahead of the first search result 210 in response to the higher priority of the visited document data 240 for the second search result 210.

In one embodiment, only a display number of entries of visited document data 240 may be displayed with a first search result 210 in response of the visited document data 240 satisfying the display criteria. The display number may be an integer in the range of 1 and 3. For example, for a display number of one, the code may only display 530 only one entry of visited document data 240 for the first search result 210 although multiple entries of visited document data 240 may satisfy the display criteria.

After displaying 530 the visited document data 240, the code continues to store 505 the visited document data 240 for each search result 210. In addition, the code may update visited document data 240.

By storing the visited document data 240 for previously followed links and/or folders, the embodiments preserve the necessary information in the visited document data 240 to identify a destination document for a previous search. As a result, when the search is repeated, the visited document data 240 may be displayed along with the search results 210. The user may then select the visited document data 240 to more rapidly navigate to the previously visited document. As a result, the search is completed more rapidly.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a display;
   a processor;
   a memory that stores code executable by the processor to perform:
   storing visited document data comprising one or more of a visited document address and a visited document description for each document visited, wherein each visited document address is an Internet protocol (IP) address and comprises a domain name; and
   displaying on the display one or more of a first visited document address and a first visited document description with a search result in response to an initial portion of the visited document address matching an initial portion of a search result address, wherein the initial portion of the visited document address matches the initial portion of the search result address if an initial domain name of the visited document address matches an initial domain name of the search result address.

2. The apparatus of claim 1, wherein the visited document data further comprises visited document activity data and a plurality of one or more of first visited document addresses and first visited document descriptions are displayed prioritized based on the visited document activity data for each of the first visited document addresses.

3. The apparatus of claim 2, wherein the plurality of the one or more of the first visited document addresses and the first visited document descriptions are prioritized by document visit duration.

4. The apparatus of claim 2, wherein the plurality of the one or more of the first visited document addresses and the first visited document descriptions are prioritized by most recent document visit time.

5. The apparatus of claim 1, wherein the one or more of the visited document address and the visited document description are stored by one or more of a browser, a search engine, and a browser plug-in.

6. The apparatus of claim 1, wherein the one or more of the first visited document address and the first visited document description are displayed as one of overlaying the search result and adjacent to the search result.

7. The apparatus of claim 1, wherein the one or more of the first visited document address and the first visited document description are displayed integrated with the search result.

8. A method comprising:
   storing, by use of a processor, visited document data comprising one or more of a visited document address and a visited document description for each document visited, wherein each visited document address is an Internet protocol (IP) address and comprises a domain name; and
   displaying one or more of a first visited document address and a first visited document description with a search result in response to an initial portion of the visited document address matching an initial portion of a search result address, wherein the initial portion of the visited document address matched the initial portion of the search result address if an initial domain name of the visited document address matches an initial domain name of the search result address.

9. The method of claim 8, wherein the visited document data further comprises visited document activity data and a plurality of one or more of first visited document addresses and first visited document descriptions are displayed prioritized based on the visited document activity data for each of the first visited document addresses.

10. The method of claim 9, wherein the plurality of the one or more of the first visited document addresses and the first visited document descriptions are prioritized by document visit duration.

11. The method of claim 9, wherein the plurality of the one or more of the first visited document addresses and the first visited document descriptions are prioritized by most recent document visit time.

12. The method of claim 8, wherein the one or more of the visited document address and the visited document description are stored by one or more of a browser, a search engine, and a browser plug-in.

13. The method of claim 8, wherein the one or more of the first visited document address and the first visited document description are displayed one of overlaying the search result and adjacent to the search result.

14. The method of claim 8, wherein one or more of the first visited document address and the first visited document description are displayed integrated with the search result.

15. A program product comprising a computer readable storage medium that stores code executable by a processor, the executable code comprising code to perform:
   storing visited document data comprising one or more of a visited document address and a visited document description for each document visited, wherein each visited document address is an Internet protocol (IP) address and comprises a domain name; and
   displaying one or more of a first visited document address and a first visited document description with a search result in response to an initial portion of the visited document address matching an initial portion of a search result address, wherein the initial portion of the visited document address matches the initial portion of the search result address if an initial domain name of the visited document address matches an initial domain name of the search result address.

16. The program product of claim 15, wherein the visited document data further comprises visited document activity data and a plurality of one or more first visited document addresses and first visited document descriptions are displayed prioritized based on the visited document activity data for each of the first visited document addresses.

17. The program product of claim 16, wherein the plurality of the one or more of the first visited document addresses and the first visited document descriptions are prioritized by document visit duration.

18. An apparatus comprising:
a processor;
a memory that stores code executable by the processor to perform:
storing a visited document address, and visited document description data comprising a document visit duration for each document accessed, wherein each visited document address is an Internet protocol (IP) address and comprises a domain name; and
displaying one or more of a first visited document address and a first visited document description data with a search result based on the document visit duration.

\* \* \* \* \*